United States Patent Office 2,915,535
Patented Dec. 1, 1959

2,915,535

PROCESS AND INTERMEDIATES TO PRODUCE SUBSTITUTED 4-BROMO-21-ACETOXY-PREGNANE-3,20-DIONE COMPOUNDS

Julien Warnant, Paris, France, assignor to Les Laboratoires Francais de Chimiotherapie, Paris, France, a body corporate of France No Drawing. Application March 22, 1955
Serial No. 496,051

Claims priority, application France March 26, 1954

5 Claims. (Cl. 260—397.45)

The present invention relates to the production of substituted pregnanedione compounds and more particularly to the production of 21-acyloxy-4-bromo pregnane-3,20-dione compounds by a new process, and to valuable new intermediates obtained thereby.

In my co-pending application Serial No. 491,533, filed March 1, 1955, entitled Substituted Pregnanedione Compounds and a Process of Making Same, I have described a process of producing 21-acyloxy-4-bromo pregnane-3,20-dione compounds of the following Formula II by starting with the corresponding 17,21-dibromopregnane-3,20-dione compounds of the following Formula I

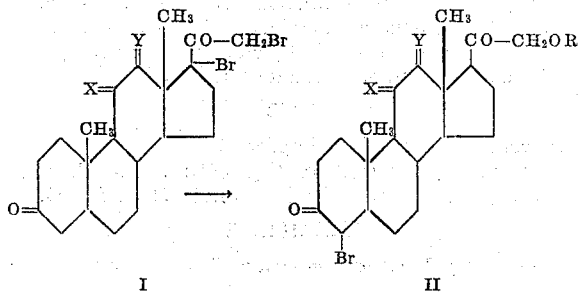

In said formulas X and Y are substituents capable of saturating the extranuclear valencies of the carbon atoms 11 and 12 of ring C of the steroid ring system. Said substituents are either two hydrogen atoms for each of said X and Y, or one of said X and Y is a secondary alcohol group, a keto group, or a group which, on hydrolysis, is readily converted into a secondary alcohol group or a keto group such as an ester or ether or an acetal, enol ester or enol ether group. It is understood the the secondary alcohol group in said compounds can be in α- or in β-orientation according to conventionally used terminology in steroid chemistry. R in said formula is an acyl group and preferably an acetyl group.

The process disclosed in said co-pending application involves the steps which consist in producing, by dibromination of a 3-acyloxy pregnane-20-one compound, a 17,21-dibromo-3-acyloxy pregnane-20-one compound, setting free the hydroxyl group in 3-position by alcoholysis, oxidizing the 3-hydroxyl group in the resulting 17,21-dibromo-3-hydroxy-pregnane-20-one compound to the keto group, splitting off hydrogen bromide and, thereby, introducing a double bond in 16,17-position of said compound, replacing the bromine atom in 21-position by iodine, exchanging the iodine in 21-position by an acyloxy group, catalytically hydrogenating the double bond in 16,17-position, and introducing bromine in 4-position of the resulting 21-acyloxy pregnane-3,20-dione compound.

It is one object of the present invention to provide an improved process of producing such 21-acyloxy-4-bromo pregnane-3,20-dione compounds which process employs, as starting materials, the readily available 3α- or 3β-hydroxy pregnane-20-one compounds or a mixture of said isomers.

Another object of the present invention is to provide new and valuable 3-formyloxy-21-acyloxy pregnane-20-one compounds which are obtained as intermediate compounds on carrying out the new process according to the present invention.

Other objects of the present invention and advantageous features thereof will become apparent as the description proceeds.

The process according to the present invention proceeds, in principle, according to the flow sheet given hereinafter in columns 1, 2, 3 and 4. The starting material, the 3α- or 3β-hydroxy pregnane-20-one compounds or a

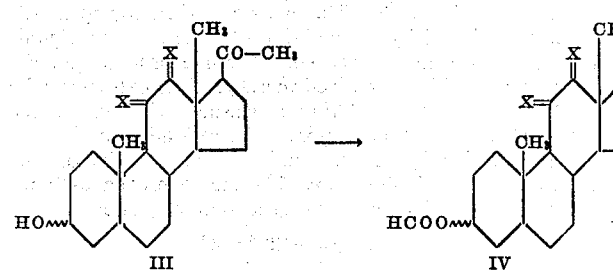

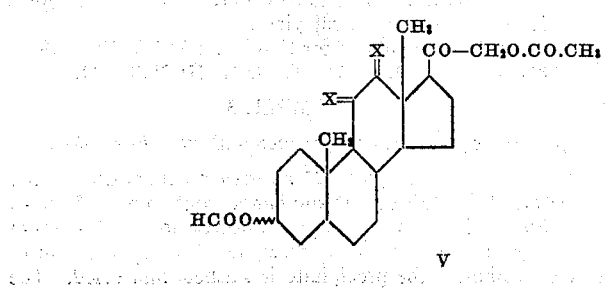

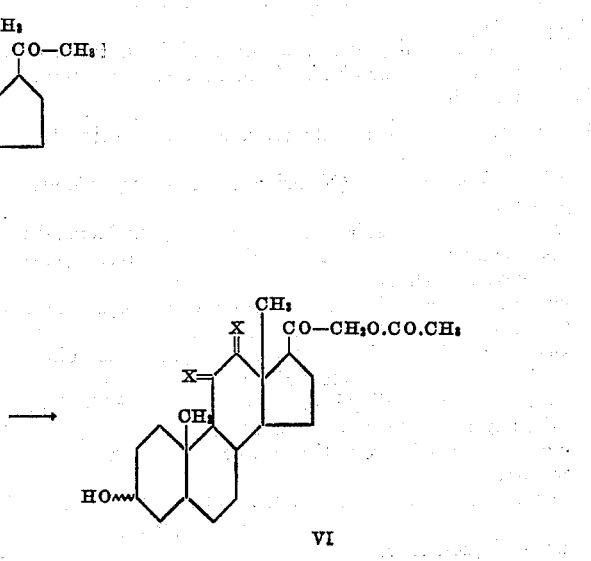

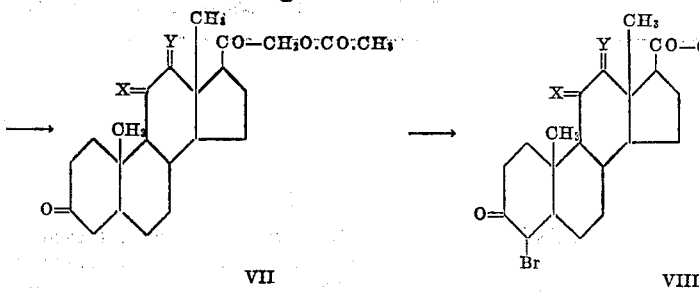

mixture of said two isomers corresponding to Formula III are first converted into a corresponding 3-formyl derivatives of Formula IV. It is a very important feature of the present invention to produce said 3-formyl derivatives and imparts to the new process a considerable economic advantage over heretofore used processes. 3-formyloxy-21-acetoxy pregnane-20-one compounds corresponding to Formula V are obtained by the action of lead tetraacetate on said 3-formyloxy pregnane-20-one compounds of Formula IV. Thereafter, the hydroxyl group in 3-position is set free by methanolysis of Compound V in the presence of an acid. It is very surprising and quite unexpected that thereby only the hydroxyl group in 3-position is reconstituted while the 21-acetoxy group remains substantially unaffected. It is evident that formylation according to the first step of this process assures selective mono-saponification of the acyl group in 3-position only. Protecting the 3-hydroxyl group in another manner does not permit such a selective saponification. The resulting 3α- or 3β-hydroxy-21-acetoxy pregnane-20-one compound of Formula VI is then oxidized to convert the alcohol group in 3-position into the keto group. Thereby 21-acetoxy pregnane-3,20-dione compounds of Formula VII are obtained. Bromination of said compounds, preferably by means of bromine in acetic acid or dimethyl formamide, yields 21-acetoxy-4-bromo pregnane-3,20-dione compounds of Formula VIII, i.e. the same products as they can be obtained according to my above indicated co-pending application.

The 4-bromo-21-acyloxy-pregnane-3,20-dione compounds corresponding to Formula VIII as they are obtained thereby, can readily be dehydrobrominated whereby a double bond is introduced in 4,5-position. Said splitting off of hydrogen bromide is effected according to conventionally used processes such as reacting with tertiary bases, converting said keto compounds into the 3-dinitro phenyl hydrazones or the 3-semicarbazones and the like and decomposing said keto derivatives, or by means of lithium chloride or bromide in dimethyl formamide according to the process disclosed by Holysz in "Journal of the American Chemical Society," 1953, volume 75, page 4432.

Thereby, depending upon the nature of the substituents X and Y, there can be obtained, for instance, the following compounds:

Desoxycorticosterone acetate (X and Y each being two hydrogen atoms),
Corticosterone acetate (X being a secondary alcohol group),
Also the acetate of substance B according to Kendall's nomenclature, or 21-acetate of 11β,21-dihydroxy-Δ$_4$-pregnene-3,20-dione,
21-acetate of 11α,21-dihydroxy-Δ$_4$-pregnene-3,20-dione (X being a secondary alcohol group),
21-acetate of 12β,21-dihydroxy-Δ$_4$-pregnene-3,20-dione (Y being a secondary alcohol group),
21-acetate of 12α,21-dihydroxy-Δ$_4$-pregnene-3,20-dione (Y being a secondary alcohol group),
Acetate of 11-dehydrocorticosterone (X being a keto group),
Also the acetate of substance A according to Kendall's nomenclature, or the acetate of 21-hydroxy-Δ$_4$-pregnene-3,11,20-trione,
Acetate of 21-hydroxy-Δ$_4$-pregnene-3,12,20-trione (Y being a keto group).

All these compounds and other similar compounds are useful in human and veterinary therapy on account of their hormone activity. They can also be employed as intermediate products in the synthesis of other compounds with hormone activity.

The following examples serve to illustrate the present invention and more particularly the production of 21-acetoxy-4-bromo pregnane-3,20-dione (Formula VIII wherein both X and Y are two hydrogen atoms) without, however, limiting the same thereto.

EXAMPLE 1

3α-formyloxy pregnane-20-one (Formula IV)

100 g. of 3α-hydroxy pregnane-20-one are dissolved at a temperature of 18–20° C. in 300 cc. of 98% formic acid. The mixture is allowed to stand at said temperature for 5 hours. 75 g. of ice are added thereto while stirring. After about 10 minutes crystallization sets in. 225 g. of ice are added within about 30 minutes and the mixture is stirred for one hour. The filtered crystalline product is recrystallized from methanol. 105.5 g. of 3α-formyloxypregnane-20-one are obtained. The yield amounts to about 97% of the theoretical yield. The pure compound melts at 97° C. and has a rotatory power of $$[\alpha]_D = +122° \pm 1.5°$$

(concentration: 1% in chloroform).

Analysis.—Calculated for $C_{22}H_{34}O_3$: 76.2% C; 9.9% H; 13.9% O. Found: 76.4% C; 10.0% H; 13.5% O.

EXAMPLE 2

3α-formyloxy-21-acetoxy pregnane-20-one (Formula V)

50 g. of 3α-formyloxy pregnane-20-one obtained according to Example 1 are dissolved in 750 cc. of acetic acid. 75 g. of freshly prepared lead tetraacetate with a lead content of 40–41% of lead are added to said solution. The reaction mixture is heated to about 70° C. and reacted for 24 hours. The mixture is then cooled to 15° C., precipitated by the addition of water, the precipitate is filtered off, and is washed. A crude product containing lead dioxide is obtained thereby. It is extracted with ether, the ethereal solution is washed with water, and concentrated by evaporation. The crystalline compound obtained thereby is recrystallized from methanol and yields 21 g. of 3α-formyloxy-21-acetoxy pregnane-20-one melting at 115° C. and having a rotatory power $$[\alpha]_D = +120° \pm 2°$$

(concentration: 1% in chloroform). The yield amounts to 35% of the theoretical yield.

Analysis.—Calculated for $C_{24}H_{36}O_5$: 71.2% C; 9.0% H; 19.8% O. Found: 71.1% C; 8.9% H; 20.0% O.

EXAMPLE 3

3α-hydroxy-21-acetoxy pregnane-20-one (Formula VI)

10 g. of 3α-formyloxy-21-acetoxy pregnane-20-one are dissolved in 400 cc. of methanol containing 1.5 g. of sulfuric acid. The mixture is allowed to stand at room temperature for one hour, precipitated by the addition of water, filtered, the precipitate is washed, and dried. The product is recrystallized from methanol and yields 7 g. of 3α-hydroxy-21-acetoxy pregnane-20-one, melting at 180° C. and having a rotatory power of $$[\alpha]_D = +108° \pm 2°$$

(concentration: 1% in chloroform). The yield amounts to 75% of the theoretical yield.

EXAMPLE 4

*21-acetoxy pregnane-3,20-dione (Formula VII)*

3 g. of 3α-hydroxy-21-acetoxy pregnane-20-one are dissolved in 42 cc. of tertiary butanol and 6 cc. of water. The mixture is heated to 50° C. 3 g. of N-bromo succinimide are added thereto while stirring. The resulting red solution is kept at a temperature of 50° C. for several minutes and is then, while still warm, poured into a mixture of water and ice which contains a small quantity of sodium bisulfite. The mixture is allowed to stand for one hour. The precipitate is filtered off and dried. On recrystallization from methanol, 2.4 g. of 21-acetoxy pregnane-3,20-dione melting at 151–152° C. and having a rototary power of $[\alpha]_D = +100° \pm 2°$ (concentration: 0.5% in acetone). The yield amounts to about 80% of the theoretical yield.

EXAMPLE 5

*4-bromo-21-acetoxy pregnane-3,20-dione (Formula VIII)*

2.2 g. of 21-acetoxy pregnane-3,20-dione are dissolved in 10 parts by volume of acetic acid. The calculated amount of bromine dissolved in acetic acid which contains an equimolecular amount of sodium acetate is added thereto.

During the addition of bromine the reaction mixture becomes of pasty consistency and then crystallizes. The crystals are filtered off, washed with acetic acid and then with water, dried, and recrystallized from ethyl acetate. 1.3 g. of 4-bromo-21-acetoxy pregnane-3, 20-dione melting at 203° C. and having a rotatory power $$[\alpha]_D = +110° \pm 2°$$

(concentration: 1% in chloroform).

The yield amounts to about 50% of the theoretical yield. The compound is insoluble in water, slightly soluble in ether, isopropyl ether, and soluble in ethyl acetate, acetone, ethanol and chloroform.

Said compound reacts, like all 3-keto steroid compounds which are brominated in 4-position, with semicarbazide whereby, at the same time, hydrogen bromide is split off yielding the 3-semicarbazone of desoxycorticosterone acetate.

This reaction is described in detail in Example 6 of my above indicated co-pending application Serial No. 491,533.

Said 3-semicarbazone can readily be converted into desoxycorticosterone acetate according to the method described by Hershberg in "Journal of Organic Chemistry," vol. 13, page 542 (1948).

Bromoxidation of the 3-hydroxy-21-acetoxy pregnane-20-one compound VI can preferably be effected according to the co-pending application Serial No. 360,878 of Gérard Nominé and Julien Warnant, entitled a Method of Producing α-Brominated Keto Steroid Compounds, filed June 11, 1953, now Patent No. 2,768,189. Said process comprises the steps of heating a mixture of N-bromo succinimide and a 3-hydroxy steroid compound in the presence of water and an oxidizable alcohol to a temperature between about 50° C. and about 70° C., in proportion, of 3-hydroxy steroid compound, N-bromo succinimide, and oxidizable alcohol, calculated for each bromine atom introduced in α-position to the keto group, of about 1 mol of keto steroid compound to about 2 mols of N-bromo succinimide to at least about 1 mol of oxidizable alcohol, and separating the resulting α-brominated keto steroid compound from the reaction mixture.

Of course, many other changes and variations in the starting materials, the reactants, the brominating and the oxidizing agents, the reaction conditions, temperature and duration, the solvents used, the methods of working up the reaction mixtures and of purifying the reaction products, and the like, may be made by those skilled in the art in accordance with the principles set forth herein and in the claims annexed hereto.

Methanolysis can be carried out in the presence of another strong acid than sulfuric acid, such as hydrochloric acid.

Oxidation of the hydroxyl group in 3-position to the keto group can be effected by other oxidizing agents than by N-bromo succinimide, for instance N-bromo-acetamid.

I claim:

1. 3α-formyloxy-21-acetoxy pregnane-20-one, melting at 115° C., having a rotatory power $[\alpha]_D = +120°$ (in chloroform).

2. In a process of producing 21-acetoxy-4-bromo pregnane-3,20-dione, the steps comprising dissolving 3-hydroxy pregnane-20-one in formic acid, allowing the mixture to stand at room temperature until formation of 3-formyloxy pregnane-20-one is completed, adding ice to said mixture to cause crystallization of said 3-formyloxy pregnane-20-one, dissolving said 3-formyloxy pregnane-20-one in acetic acid, adding freshly prepared lead tetraacetate to said solution, heating the mixture to about 70° C. until acetoxylation is completed, adding water to the reaction mixture to precipitate crude 3-formyloxy-21-acetoxy pregnane-20-one, purifying said compound by extraction with ether, dissolving said 3-formyloxy-21-acetoxy pregnane-20-one in methanol containing about 0.4% of sulfuric acid, allowing the mixture to stand at room temperature until partial saponification to 3-hydroxy-21-acetoxy pregnane-20-one is completed, dissolving said compound in tertiary butanol containing water, heating the solution to about 50° C., adding N-bromo succinimide thereto, keeping the reaction mixture at said temperature of about 50° C. until oxidation of the 3-hydroxyl group to the keto group is completed, dissolving the resulting 21-acetoxy pregnane-3,20-dione in acetic acid, adding thereto a solution of bromine in acetic acid containing sodium acetate, said bromine and said sodium acetate being added in equimolecular amounts, and recovering the precipitated 4-bromo-21-acetoxy pregnane-3,20-dione isolated thereby.

3. In a process of producing 4-bromo-21-acetoxy pregnane-3,20-dione compounds of the formula

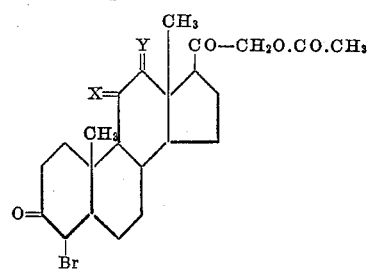

wherein X and Y are substituents selected from the group consisting of two hydrogen atoms, a secondary hydroxyl group, and a keto group, at least one of said substituents X and Y being two hydrogen atoms, the steps comprising formylating the 3-hydroxyl group in a 3-hydroxy pregnane-20-one compound of the formula

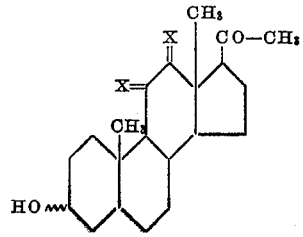

wherein X and Y are the same substituents as indicated above, adding lead tetra-acetate to the resulting 3-formyloxy compound, heating the mixture until 21-acetoxylation is completed, reacting the resulting 3-formyloxy-21-acetoxy compound with a mineral acid in the presence of methanol to cause selective partial saponification to the corresponding 3-hydroxy-21-acetoxy compound, oxidizing the resulting 3-hydroxy-21-acetoxy compound by means of an N-bromo acylimide in tertiary butanol, adding bromine in acetic acid containing sodium acetate to the resulting 21-acetoxy-3-one compound, and recovering the precipitated 4-bromo-21-acetoxy pregnane-3-one compound from the bromination mixture.

4. In the process according to claim 3, wherein oxidation of the 3-hydroxyl group to the corresponding keto group and introducing bromine in 4-position of the resulting 21-acetoxy pregnane-3,20-dione compound is carried out simultaneously by heating said 3-hydroxy steroid compound with N-bromo succinimide in the presence of water and an oxidizable alcohol to a temperature between about 50° C. and about 70° C.

5. The process according to claim 3, wherein selective partial saponification of the 3-formyloxy group is effected with sulfuric acid in the presence of methanol at room temperature.

References Cited in the file of this patent

UNITED STATES PATENTS

| | | |
|---|---|---|
| 2,160,719 | Butenandt | May 30, 1939 |
| 2,440,874 | Reichstein | May 4, 1948 |
| 2,538,731 | Levin et al. | Jan. 16, 1951 |
| 2,751,380 | Slomp | June 19, 1956 |
| 2,769,020 | Hershberg | Oct. 30, 1956 |
| 2,787,623 | Gebert | Apr. 2, 1957 |
| 2,802,839 | Ringold et al. | Aug. 13, 1957 |